US008503757B2

(12) United States Patent
Naruse et al.

(10) Patent No.: US 8,503,757 B2
(45) Date of Patent: Aug. 6, 2013

(54) IMAGE MEASUREMENT DEVICE, METHOD FOR IMAGE MEASUREMENT, AND COMPUTER READABLE MEDIUM STORING A PROGRAM FOR IMAGE MEASUREMENT

(75) Inventors: Takashi Naruse, Osaka (JP); Yasutaka Kawa, Osaka (JP); Hayato Oba, Osaka (JP)

(73) Assignee: Keyence Corporation, Osaka (JP)

( * ) Notice: Subject to any disclaimer, the term of this patent is extended or adjusted under 35 U.S.C. 154(b) by 108 days.

(21) Appl. No.: 13/182,499

(22) Filed: Jul. 14, 2011

(65) Prior Publication Data
US 2012/0027289 A1    Feb. 2, 2012

(30) Foreign Application Priority Data

Aug. 2, 2010   (JP) ................................ 2010-174008

(51) Int. Cl.
*G06K 9/00* (2006.01)
(52) U.S. Cl.
USPC ........................................................ 382/152
(58) Field of Classification Search
None
See application file for complete search history.

(56) References Cited

U.S. PATENT DOCUMENTS

| | | | | |
|---|---|---|---|---|
| 6,205,240 | B1 * | 3/2001 | Pietrzak et al. ............... | 382/152 |
| 6,621,928 | B1 * | 9/2003 | Inagaki et al. ................. | 382/199 |
| 6,674,891 | B1 * | 1/2004 | Sameshima .................... | 382/152 |
| 6,839,470 | B2 * | 1/2005 | Ikeda ............................. | 382/266 |
| 7,339,663 | B2 * | 3/2008 | Lim et al. ................... | 356/237.5 |
| 8,010,224 | B2 * | 8/2011 | Yamaguchi et al. .......... | 700/173 |
| 8,041,107 | B2 * | 10/2011 | Kato et al. ..................... | 382/152 |
| 2001/0012395 | A1 * | 8/2001 | Michael et al. ................ | 382/152 |
| 2001/0040995 | A1 * | 11/2001 | Takada et al. ................. | 382/152 |
| 2003/0065487 | A1 * | 4/2003 | Rosel et al. ........................ | 703/1 |
| 2003/0219154 | A1 * | 11/2003 | Medvedeva et al. .......... | 382/144 |

(Continued)

FOREIGN PATENT DOCUMENTS

| JP | 2009-300124 | 12/2009 |
|---|---|---|
| JP | 2009-300125 | 12/2009 |

(Continued)

OTHER PUBLICATIONS

McNally, Karen. "Trapping an Earthquake". Engineering & Science. Nov.-Dec. 1979.*

*Primary Examiner* — Stephen R Koziol
*Assistant Examiner* — Sean Conner
(74) *Attorney, Agent, or Firm* — Kilyk & Bowersox, P.L.L.C.

(57) ABSTRACT

Present invention is an image measurement device capable of easily identifying a degree of disagreement between contours for a plurality of workpieces, and including: an edge extraction unit that extracts an edge line from a workpiece image; an image comparison unit that compares the workpiece image with the previously held master image, an error calculation unit that calculates, based on the comparison result, an error indicating an amount of displacement between an edge position of the workpiece image and a position of the master image corresponding to this edge position; a statistical information calculation unit that calculates statistical information of the calculated error for a plurality of workpiece images and for each edge position; a statistical information display unit that displays the statistical information along the edge line extracted from the workpiece image or the master image in a display mode suitable for the values of the statistical information.

8 Claims, 12 Drawing Sheets

U.S. PATENT DOCUMENTS

| | | | |
|---|---|---|---|
| 2007/0156379 A1* | 7/2007 | Kulkarni et al. | 703/14 |
| 2008/0036755 A1* | 2/2008 | Bae et al. | 345/418 |
| 2008/0109686 A1* | 5/2008 | Nikaido et al. | 714/57 |
| 2008/0130982 A1* | 6/2008 | Kitamura et al. | 382/144 |
| 2008/0247636 A1* | 10/2008 | Davis et al. | 382/152 |
| 2008/0276137 A1* | 11/2008 | Lin et al. | 714/57 |
| 2010/0278418 A1* | 11/2010 | Chang et al. | 382/152 |
| 2011/0219352 A1* | 9/2011 | Majumder et al. | 716/139 |
| 2012/0013898 A1* | 1/2012 | Judell et al. | 356/237.2 |
| 2012/0328181 A1* | 12/2012 | Kitamura et al. | 382/145 |

FOREIGN PATENT DOCUMENTS

| | | |
|---|---|---|
| JP | 2010-019667 | 1/2010 |
| JP | 2010-032329 | 2/2010 |
| JP | 2010-032330 | 2/2010 |
| JP | 2010-032331 | 2/2010 |
| JP | 2010-032471 | 2/2010 |
| JP | 2010-060528 | 3/2010 |
| JP | 2010-169584 | 8/2010 |

* cited by examiner

MASTER IMAGE

DISPLAY EXAMPLE IN WHICH THE VARIANCE VALUE OF
THE ERRORS IS SELECTED AS THE STATISTICAL INFORMATION

IMAGE MEASUREMENT DEVICE, METHOD FOR IMAGE MEASUREMENT, AND COMPUTER READABLE MEDIUM STORING A PROGRAM FOR IMAGE MEASUREMENT

CROSS-REFERENCE TO RELATED APPLICATIONS

The present application claims foreign priority based on Japanese Patent Application No. 2010-174008, filed Aug. 2, 2010, the contents of which is incorporated herein by reference.

BACKGROUND OF THE INVENTION

1. Field of the Invention

The present invention relates to an image measurement device, a method for image measurement, and a computer readable medium storing a program for image measurement. In more detail, the present invention relates to an image measurement device for measuring a size of a workpiece based on edge position of the workpiece image.

2. Description of the Related Art

Generally, the image measurement device is a device for measuring the size of the workpiece based on the edge position of the workpiece image (Japanese patent publication No. 2009-300124, No. 2009-300125, No. 2010-019667). As usual, the workpiece is placed on a movable stage which can be moved in X-axis, Y-axis and Z-axis directions. It is possible to focus the workpiece image by moving the movable stage in the Z-axis direction and adjust the position of the workpiece within a view of the image measurement device by moving the movable stage in the X-axis and Y-axis directions.

Since the workpiece image is strictly similar figure to the workpiece regardless of the position of the movable stage in the z-axis direction, it is possible to detect the actual size of the workpiece by measuring a distance or an angle of the workpiece image. For measuring the size of the workpiece, the edge of the workpiece image is extracted. The edge extraction is performed by detecting the edge point by analyzing a brightness change of the workpiece image and fitting the plurality of the detected edge points with geometrical elements such as line and circular arc, therein the edge indicating a boundary between the workpiece and background is determined.

A conventional image measurement device which compares the workpiece image with a previously captured master image and calculates an error indicating displacement amounts between the edge positions of the workpiece image and the corresponding master image is known. The conventional image measurement device compares the calculated error with predetermined tolerance and makes a quality check on the edge shape of the workpiece. Such a conventional image measurement device can calculate the size such as the distance or angle of the each plurality of the workpieces to be measured sequentially for quality management of the same kind of the workpiece to be manufactured through the same manufacturing process and display calculated average values and variance values of the measured size.

SUMMARY OF THE INVENTION

The invention provides an image measurement device, a method for image measurement, and a computer readable medium storing a program for image measurement indicating a degree of correspondence between contours of the workpieces. In some embodiments, the present invention may be applied to an image measurement device by which the user can easily identify statistical information about the error of the edge position of the any edges extracted from the captured workpiece image or the stored master image.

According to a first aspect of the present invention, an image measurement device for obtaining a workpiece image by imaging the workpiece and measuring a size of the workpiece based on edge positions of the workpiece image, includes; an edge extraction section for extracting the edges from the workpiece image; an image comparison section for comparing the workpiece image and a previously held design data; an error calculation section for calculating the errors indicating an amount of displacement between the edge positions of the workpiece image and positions of the design data corresponding to the edge positions; a statistical information calculation section for calculating the statistical information of the errors respectively calculated for a plurality of workpiece images for the each edge positions; a statistical information display section for displaying the statistical information along the edge positions extracted from the workpiece image or the design data in a display mode suitable for the values of the statistical information.

According to the first aspect of the present invention, since the statistical information indicating the error between the each edge position of the workpiece image and the corresponding position of the design data for the plurality of the workpiece images and is displayed along the edge position, the statistical information of the error of any point along the edge can be identified easily. That is, since the statistical information of the error obtained from the plurality of the workpiece images is displayed along the edge position, where the statistical information indicates in the workpiece image can be intuitive identified. Therefore, the degree of the disagreement of the contours for the plurality of the workpiece can be identified easily. For example, when the decrease in the processing accuracy occurs locally, where the decrease occurs can be intuitive identified.

According to a second aspect of the present invention, the image measurement device further includes; a statistical information specification section for specificating the statistical information to be displayed, wherein the statistical information calculation section calculates at least one of an average value of the errors, a variance value of the errors, a ratio of the errors not exceeding a tolerance, a ratio of the errors exceeding the tolerance and a slope of a moving average of the errors, and the statistical information display section displays the specificated statistical information along the edge positions.

According to a third aspect of the present invention, the image measurement device further includes; an edge position specification section for specificating an edge position in the workpiece image or the desing data, wherein the statistical information display section displays a chronological information including the errors of the respective workpiece images at the specificated edge position.

According to a fourth aspect of the present invention, in addition to the configuration described above, the statistical information display section displays dots having different colors depending on the values of the statistical information along the edge positions.

According to a fifth aspect of the present invention, in addition to the configuration described above, the statistical information display section displays dots having different size depending on the values of the statistical information along the edge positions.

According to a sixth aspect of the present invention, in addition to the configuration described above, the statistical information display section displays histograms showing different heights depending on the values of the statistical information along the edge positions.

According to a seventh aspect of the present invention, an image measurement method for obtaining a workpiece image by imaging the workpiece and measuring a size of the workpiece based on edge positions of the workpiece image comprises the steps of extracting the edges from the workpiece image; comparing the workpiece image and a previously held design data; calculating the errors indicating an amount of displacement between the edge positions of the workpiece image and positions of the design data corresponding to the edge positions; calculating the statistical information of the errors respectively calculated for a plurality of workpiece images for the each edge positions; displaying the statistical information along the edge positions extracted from the workpiece image or the design data in a display mode suitable for the values of the statistical information.

According to an eighth aspect of the present invention, a program for image measurement device for obtaining a workpiece image by imaging the workpiece and measuring a size of the workpiece based on edge positions of the workpiece image comprises; a function of extracting the edges from the workpiece image; a function of comparing the workpiece image and a previously held design data; a function of calculating the errors indicating an amount of displacement between the edge positions of the workpiece image and positions of the design data corresponding to the edge positions; a function of calculating the statistical information of the errors respectively calculated for a plurality of workpiece images for the each edge positions;
a function of displaying the statistical information along the edge positions extracted from the workpiece image or the design data in a display mode suitable for the values of the statistical information.

According to the image measurement device, the image measurement method and the program for the image measurement device of the present invention, since the statistical information indicating the error between the each edge position of the workpiece image and the corresponding position of the design data for the plurality of workpiece images and is displayed along the edge position, the statistical information of the error of any point along the edge can be identified easily. Therefore, the degree of the disagreement of the contours for the plurality of the workpiece can be identified easily.

DETAILED DESCRIPTION OF PREFERRED EMBODIMENTS

Image Measurement Device

Figure 1:
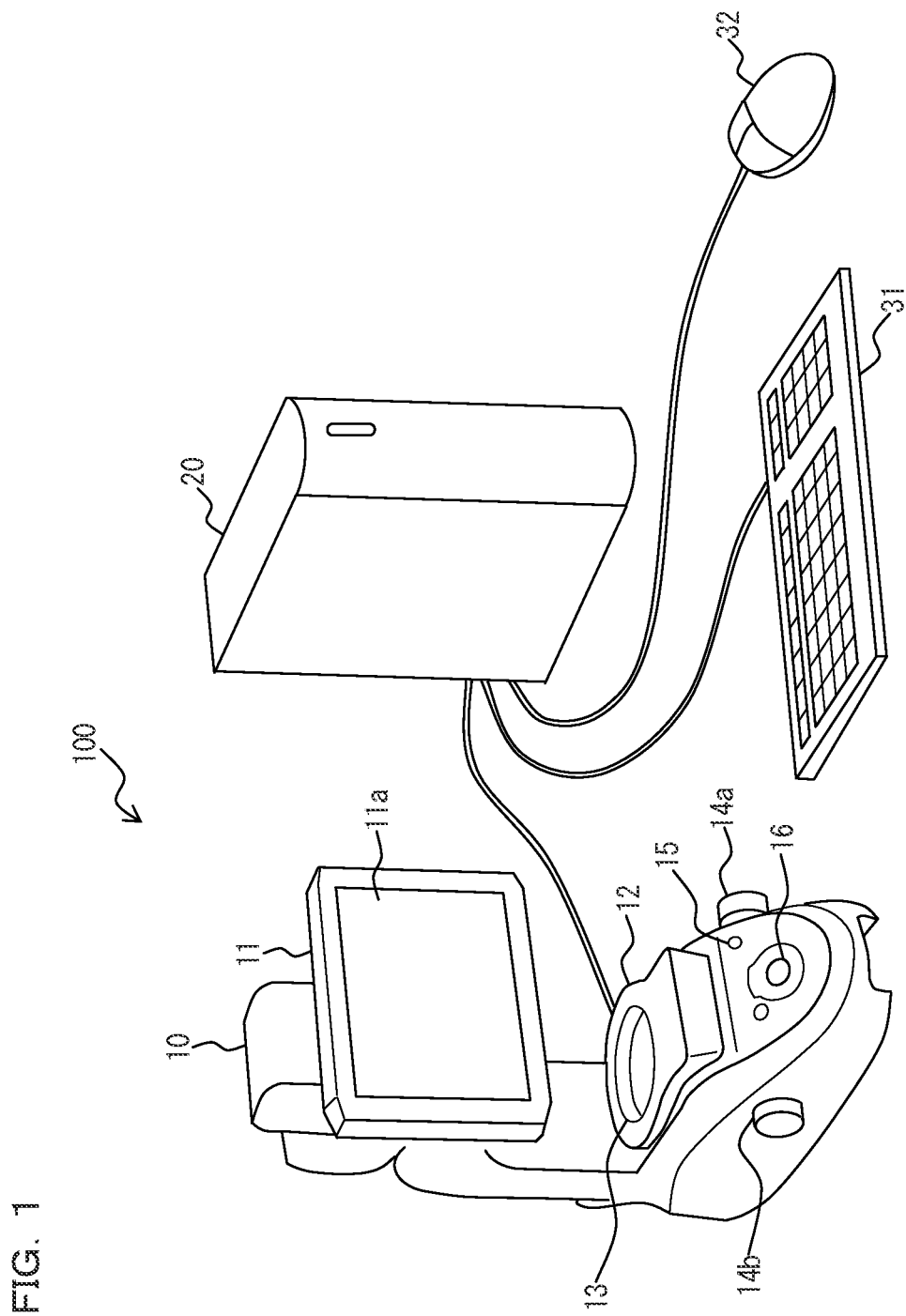
FIG. 1 is a perspective view showing an example of a configuration of an image measurement device 100 according to an embodiment of the present invention.

FIG. 1 is a perspective view showing one example of a configuration of an image measurement device 100 according to an embodiment of the present invention. The image measurement device 100 is a measuring instrument configured to pick up images of a plurality of workpieces placed in a detection area 13 on a movable stage 12 at different imaging magnifications and analyze the picked-up images, thereby automatically measuring a size of each workpiece. The image measurement device 100 is provided with a measuring unit 10, a control unit 20, a keyboard 31, and a mouse 32. Each workpiece is an object to be measured whose shape and size are measured.

The measuring unit 10 is an optical unit configured to irradiate each workpiece with detection light, and receives transmitted or reflected light, thereby generating a picked-up image. The measuring unit 10 is provided with a display 11, the movable stage 12, an XY position adjustment knob 14a, a Z position adjustment knob 14b, a power switch 15, and a measurement start switch 16.

The display 11 is a display device configured to display the picked-up image and a measurement result in a display screen 11a. The movable stage 12 is a placement table on which the workpieces as measurement targets are placed, and provided with the detection area 13 through which the detection light is transmitted. The detection area 13 is a circular area configured by transparent glass. The movable stage 12 can be moved in a Z-axis direction that is parallel to a light axis of the detection light as well as in an X-axis direction and a Y-axis direction that are perpendicular to the light axis.

The XY position adjustment knob 14a is an operation section for moving the movable stage 12 in the X-axis direction and the Y-axis direction. The Z position adjustment knob 14b is an operation section for moving the movable stage 12 in the Z-axis direction. The power switch 15 is an operation section for turning on the measuring unit 10 and the control unit 20, and the measurement start switch 16 is an operation section for starting measurement of the workpieces.

The control unit 20 is a controller configured to control imaging and display on a screen by the measuring unit 10 and analyze the picked-up image, thereby measuring a size of each workpiece. The control unit 20 is connected with the keyboard 31 and the mouse 32. After the power is turned on, placing a plurality of workpieces randomly within the detection area 13 and operating the measurement start switch 16 allow automatic measurement of a size of each workpiece.

Measuring Unit

Figure 2:
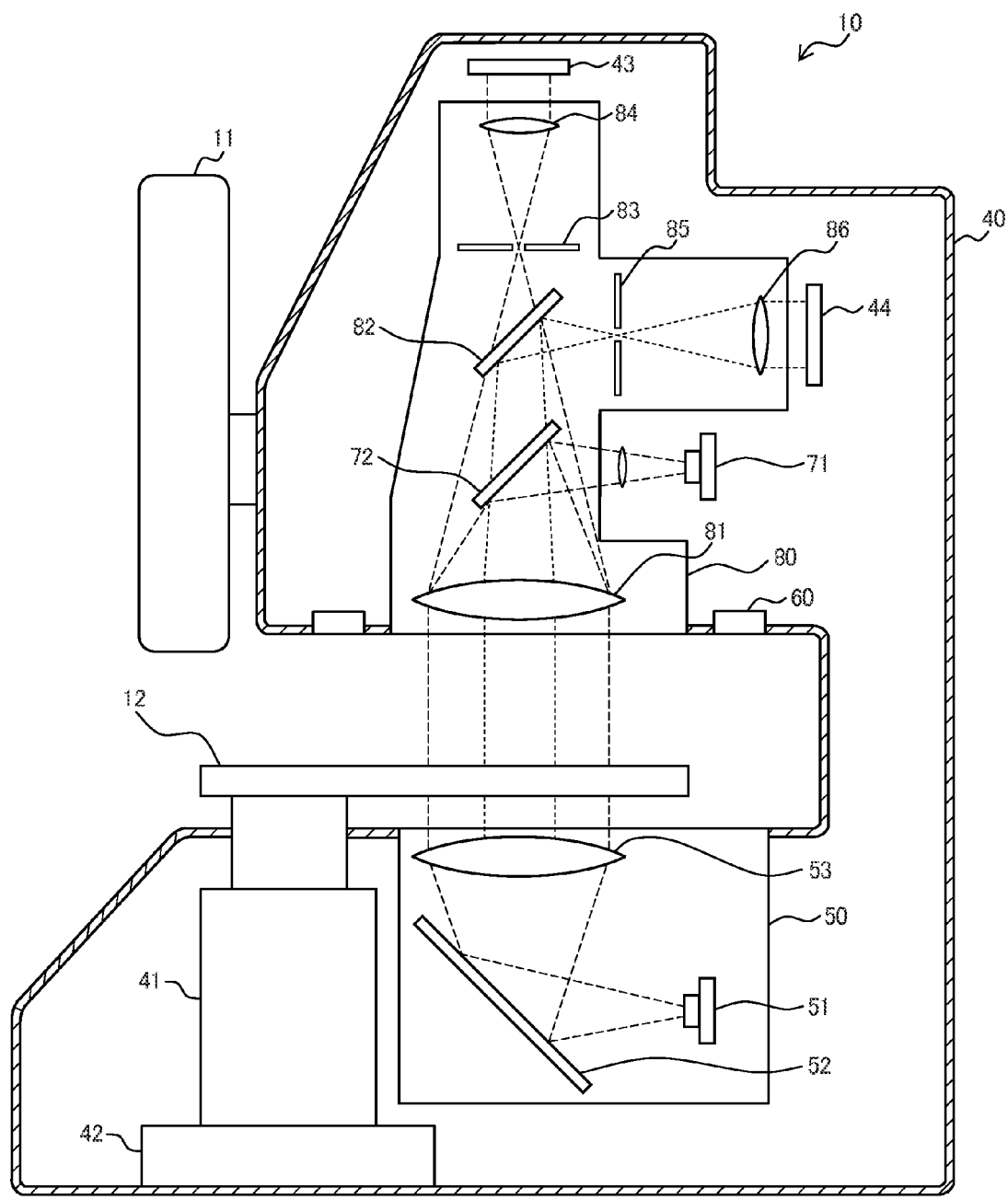
FIG. 2 is an explanatory view schematically showing an example of a configuration of a measuring unit 10 in the image measurement device 100 of FIG. 1, showing a vertical cross-section of the measuring unit 10.

FIG. 2 is an explanatory view schematically showing an example of a configuration of the measuring unit 10 in the image measurement device 100 of FIG. 1, showing a vertical cross-section of the measuring unit 10. Within a casing 40, the measuring unit 10 is provided with a Z drive section 41, an XY drive section 42, an imaging devices 43 and 44, a transmitted illumination unit 50, a ring illumination unit 60, a coaxial epi-illumination light source 71, and a receiver lens unit 80.

The Z drive section 41 is a Z position adjustment unit configured to move, based on a drive signal from the control unit 20, the movable stage 12 in the Z-axis direction and adjust a position of the workpiece in the Z-axis direction. The XY drive section 42 is an XY position adjustment unit configured to move, based on an XY drive signal from the control unit 20, the movable stage 12 in the X-axis direction and in the Y-axis direction and adjust the position of the workpiece within an XY plane.

The transmitted illumination unit 50 is an illuminating device configured to irradiate the workpiece placed on the movable stage 12 with detection light from a bottom side, and configured by a transmitting illumination light source 51, a mirror 52, and an optical lens 53. The detection light emitted from the transmitting illumination light source 51 is reflected on the mirror 52, and exits through the optical lens 53. The detection light is transmitted through the movable stage 12. A part of the transmitting light is shielded by the workpiece and the other part of the transmitting light enters the receiver lens unit 80.

The ring illumination unit 60 is an illuminating device configured to irradiate the workpiece on the movable stage 12 with detection light from a top side, and configured by a ring-shaped light source that surrounds the receiver lens unit 80. The coaxial epi-illumination light source 71 is a light source configured to irradiate the workpiece on the movable stage 12 with detection light from the top side, and provided with a half mirror 72 such that a light axis of the light emitted to the workpiece and a light axis of the light reflected on the workpiece are coaxial. One of the transmitted illumination, the ring illumination, and the coaxial epi-illumination can be selectively used to illuminate the workpiece.

The receiver lens unit 80 is an optical system configured by receiver lenses 81, 84, and 86, a half mirror 82, and throttle plates 83 and 85, and configured to receive light transmitted from the transmitted illumination unit 50 and reflected light of the detection light on the workpiece, thereby causing the imaging devices 43 and 44 to form an image. The receiver lens 81 is an optical lens disposed on a side of the movable stage 12 so as to face toward an upper surface of the movable stage 12. The receiver lens 84 is an optical lens disposed on a side of the imaging device 43 so as to face toward the imaging device 43. Further, the receiver lens 86 is an optical lens disposed on a side of the imaging device 44 so as to face toward the imaging device 44.

The throttle plate 83 and the receiver lens 84 constitute a low-magnification image formation section whose imaging magnification is low, and disposed such that their central axes are aligned with those of the optical lens 53 and the receiver lens 81. By contrast, the throttle plate 85 and the receiver lens 86 constitute a high-magnification image formation section whose imaging magnification is high, and the detection light from the workpiece is incident via the half mirror 82. The receiver lenses 81, 84, and 86 are referred to as a telecentric lens having a characteristic that a size of an image does not change even when the position of the workpiece changes along the light axis direction (Z-axis direction).

The imaging device 43 is a low-magnification image sensor configured to pick up an image of the workpiece within a low-magnification visual field provided by the receiver lens unit 80 at a low magnification to generate a low-magnification image. The imaging device 44 is a high-magnification image sensor configured to pick up an image of the workpiece within a high-magnification visual field provided by the receiver lens unit 80 at a high magnification to generate a high-magnification image. The high-magnification visual field is narrower than the low-magnification visual field and provided within the low-magnification visual field.

Either of the imaging devices 43 and 44 is configured by a semiconductor device such as a charge coupled device (CCD) or a complementary metal oxide semiconductor (CMOS).

According to the image measurement device 100, it is possible to capture the workpiece in the low-magnification visual field as long as the workpiece is placed within the detection area 13 on the movable stage 12. Further, the workpiece placed within the low-magnification visual field is guided to the high-magnification visual field by analyzing the low-magnification image and moving the movable stage 12 within the XY plane, thereby being imaged at a high magnification. In the image measurement device 100, the low-magnification visual field and the high-magnification visual field are substantially concentric, and it is possible to obtain the low-magnification image and the high-magnification image at the same time.

Operation of Image Measurement Device

Figure 3:
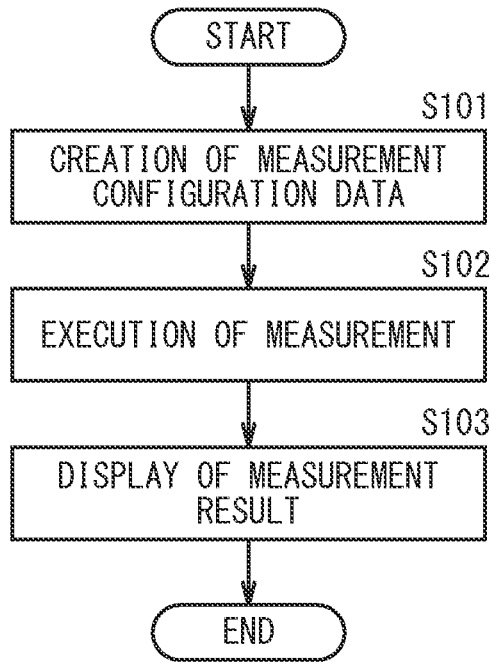
FIG. 3 is a flowchart showing one example of an operation of the image measurement device 100 of FIG. 1.

Steps S101 to S103 in FIG. 3 show a flowchart of one example of an operation of the image measurement device 100 of FIG. 1. The operation of the image measurement device 100 includes three processes, i.e., creation of measurement configuration data (step S101), execution of measurement (step S102), and display of a measurement result (step S103).

The measurement configuration data is information necessary for execution of the measurement, and includes information such as characteristic amount information indicating characteristic amounts, information indicating measurement portions and measurement types, and information indicating design values and tolerances for each measurement portion. The characteristic amount information is information for positioning used to analyze an image of a workpiece and determine a position and a posture of the workpiece, and is set based on a predetermined master image. When the characteristic amount information and the information indicating measurement portions and measurement types are set based on a high-magnification image, identification information indicative of this is held as measurement configuration data.

The measurement configuration data is created by the control unit 20. Alternatively, it is possible to use the measurement configuration data created by an information processing terminal such as a personal computer (PC) and transferred to the control unit 20. The measurement process is executed based on such measurement configuration data. Then, the process for displaying a measurement result is performed by displaying values of the size obtained by the measurement on the display 11.

Creation of Measurement Configuration Data

Figure 4:
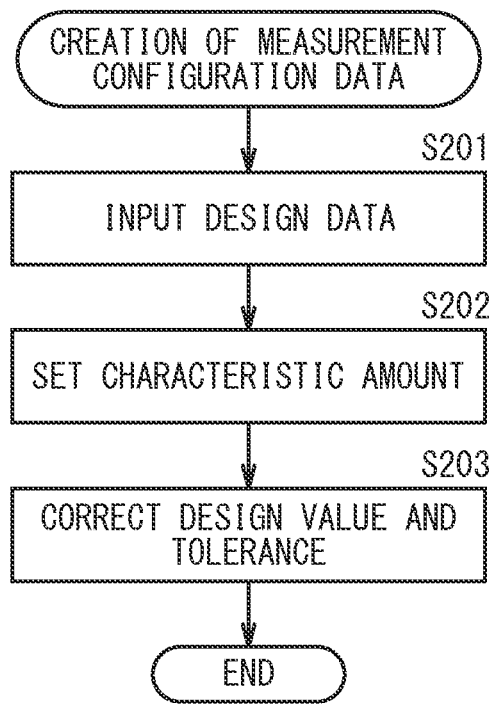
FIG. 4 is a flowchart showing one example of an operation when creating measurement configuration data in the image measurement device 100 of FIG. 1.

Steps S201 to S203 in FIG. 4 show a flowchart of one example of an operation when creating the measurement configuration data in the image measurement device 100 of FIG. 1. The flowchart shows a case in which the control unit 20 creates the measurement configuration data.

The process of creating the measurement configuration data includes three procedures, i.e., inputting design data (step S201), setting the characteristic amount (step S202), and correcting the design value and the tolerance (step S203). In the step of inputting design data, an image picked up by imaging a predetermined reference object such as the master workpiece, or computer aided design (CAD) data created by CAD is inputted, and contour information for comparing contours as will be later described is obtained based on the inputted design data. When the image picked up by imaging the master workpiece is used as the design data, the contour information is a set of points along an edge line of this image. When the CAD data is used as the design data, the contour information corresponds to a design value of the CAD data.

In a case in which a range for executing comparison of contours and a tolerance for each contour to be compared are previously set in the inputted design data, such information is also inputted when inputting the design data and set as the measurement configuration data.

In step S202, the characteristic amount is automatically extracted from the inputted design data, but setting of the characteristic amount can be executed by an user setting a range for extracting the characteristic amount.

Then, in step S203, the user can correct the range for executing comparison of contours and the tolerance as needed. By executing this step, the measurement configuration data including the range for executing comparison of contours in the design data, the contour information as the design value within the range for comparison of contours, and the tolerance of each contour position are generated and stored.

Comparison of Contours

Figure 5:
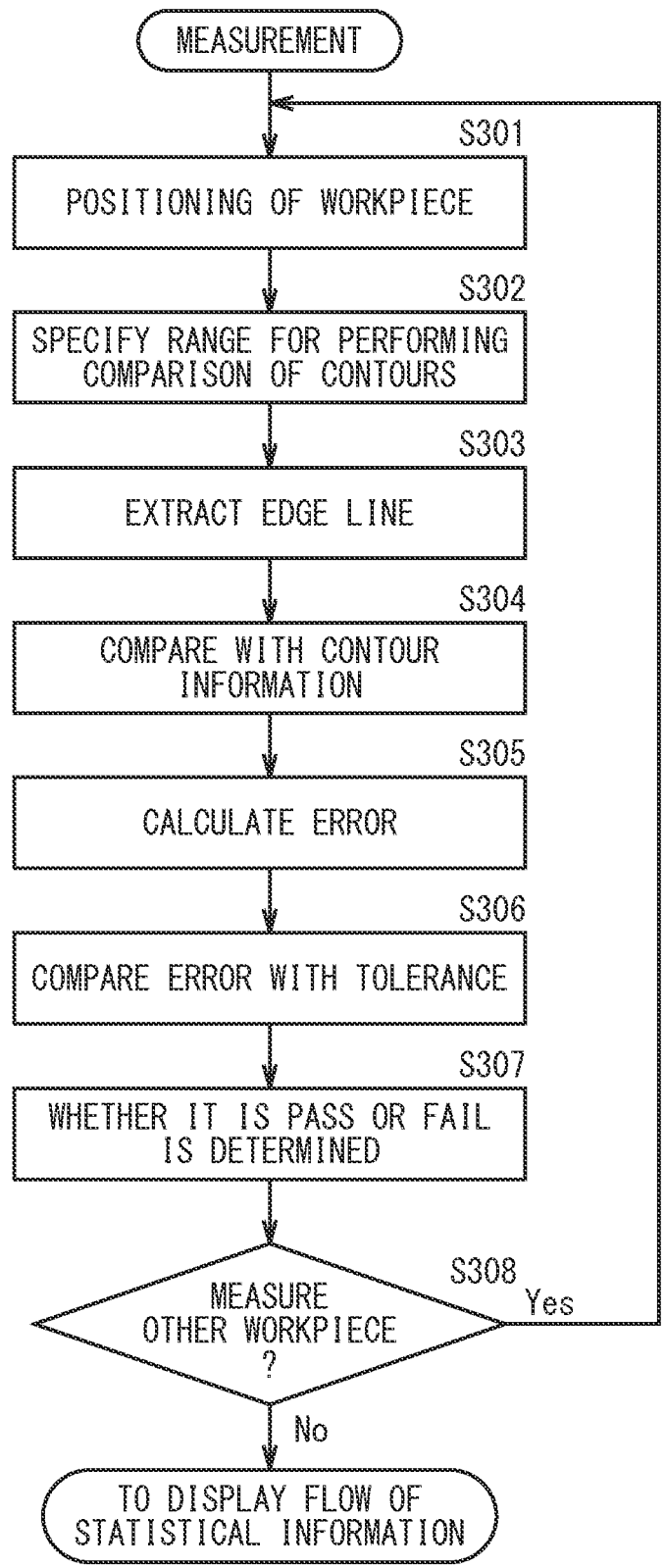
FIG. 5 is a flowchart showing one example of an operation during measurement in the image measurement device 100 of FIG. 1.

Steps S301 to S308 in FIG. 5 show a flowchart of one example of an operation during measurement in the image measurement device 100 of FIG. 1. First, positioning of a workpiece is performed by imaging the workpiece placed on the movable stage 12 to obtain a workpiece image, and by analyzing the workpiece image based on the characteristic amount information of the measurement configuration data (step S301). The positioning of the workpiece is performed by detecting a position and a posture of the workpiece within the workpiece image using a technique such as a pattern matching technique based on the characteristic amount information.

Next, based on a result of the detection of the position and the posture and the measurement configuration data, a range for performing comparison of contours is specified (step S302), and an edge line present within the range for comparison is extracted (step S303). As a method of extracting the edge line, such as a method of using a brightness value of the image, a method of using a first differential of the brightness value, and a method of using a quadratic differential of the brightness value can be employed.

Then, each of edge positions along the edge line that has been extracted is compared with the contour information (design value) of the design data corresponding to the edge position, and an error therebetween is calculated (steps S304 and S305). The error between each edge position and the design value is geometrically calculated. That is, when the contour information of the design data is given as a curved line, the error is defined as a distance between the edge position and the curved line in a normal direction. Further, when the contour information is given as standard coordinates, the error can be calculated as a distance in a direction along each of X and Y coordinate axes.

Subsequently, the error thus calculated is compared with the tolerance included in the measurement configuration data (step S306), and whether it is pass or fail is determined for each edge position (step S307). As described above, by comparing the contour information of the previously inputted design data with the edge positions along the edge line extracted from the workpiece image, it is possible to calculate the error between the edge position and the design data for each edge position. In this embodiment, the error between the edge position and the design data is calculated for each edge position. However, it is possible to calculate the errors only for a part of the edge positions by reducing the number of the edge positions for which the errors are calculated by "thinning out".

Master Image

Figure 6:
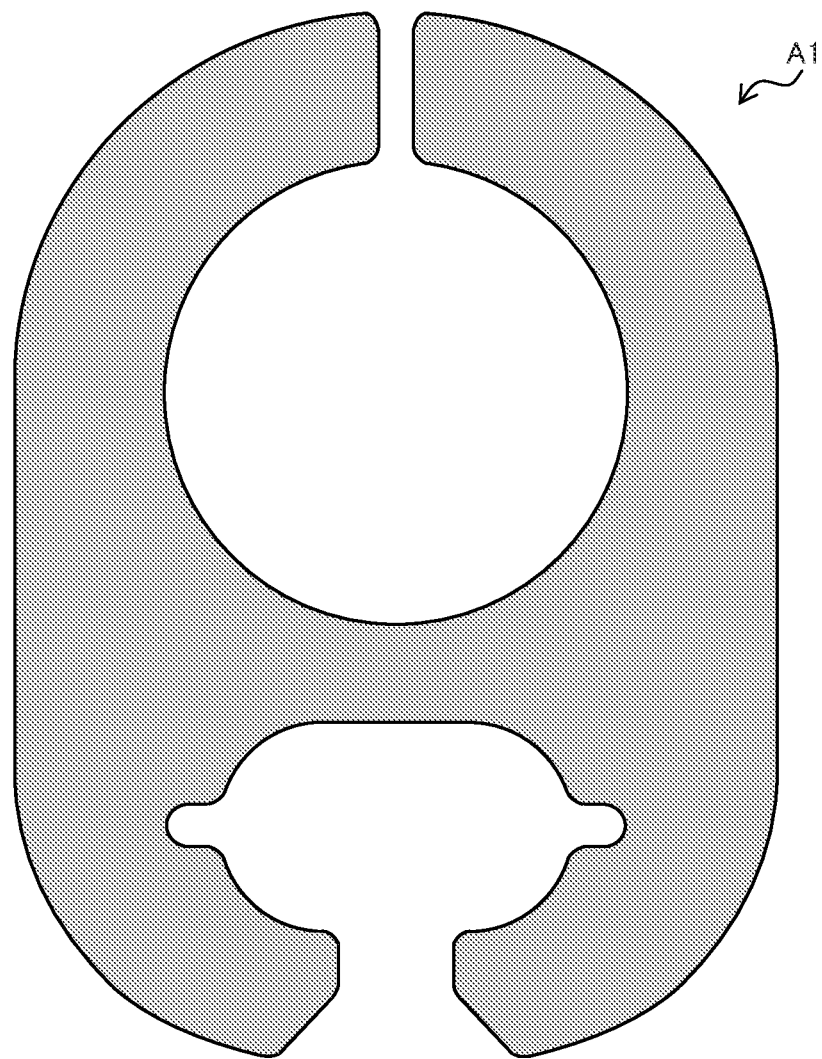
FIG. 6 is a view showing one example of a master image A1 previously held as design data.

FIG. 6 is a view showing one example of a master image A1 previously held as the design data. The master image A1 is a pattern image used for setting the characteristic amount and in the comparison of contours.

The master image A1 is created, for example, based on an image of the predetermined reference object picked up by the image measurement device 100. Alternatively, it is possible to use a CAD image created by the CAD as the master image A1. Here, an example is described in which an image of the predetermined reference object picked up by the image measurement device 100 is used as the master image A1. By comparing the master image A1 and the workpiece image obtained by imaging the workpiece described above, it is possible to detect a degree of disagreement between the contours.

Graphical Representation of Chronological Information

Figure 7:
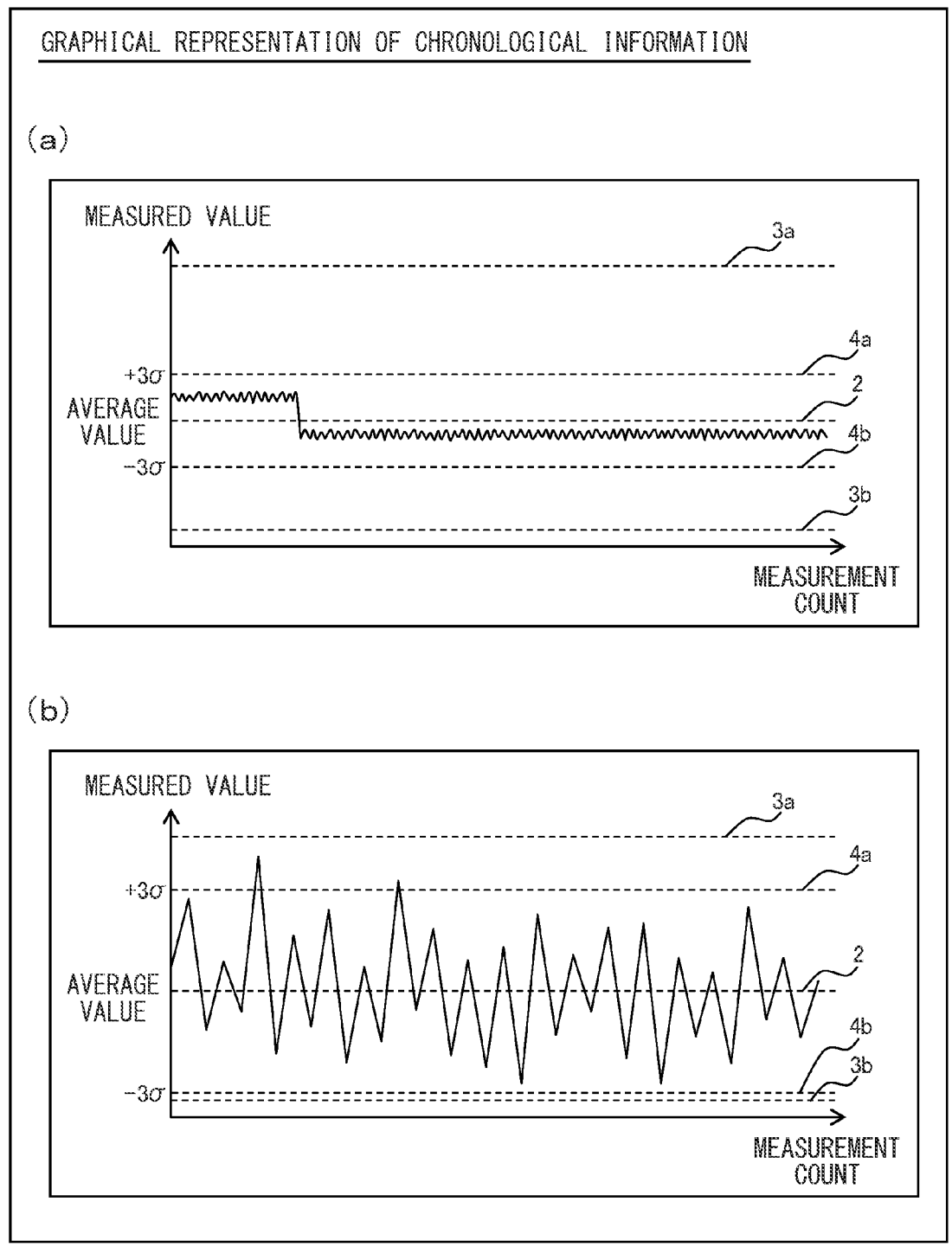
FIGS. 7A and 7B are graphs showing examples of an operation when displaying a measurement result of the image measurement device 100 of FIG. 1, each showing one example of graphical representation of chronological information associated with an edge position.

FIGS. 7A and 7B are graphs showing examples of an operation when displaying a measurement result of the image measurement device 100 of FIG. 1, each showing one example of graphical representation of chronological information associated with an edge position. When using the image measurement device 100 in a manufacturing site, in order to successively measure processed products that are processed and molded one after another and determine pass or fail, typically, it is often the case that a plurality of workpieces having the same shape and substantially the same size are successively measured. When successively measuring the workpieces having the same shape and the same size, it is possible to repeatedly use the measurement configuration data that has once been set. Therefore, the user can execute the pass-fail determination of the workpieces one after another only by setting the workpieces at the measurement position and instructing to execute the measurement.

An error between each edge position and the design data is obtained every time as the measurement is repeated, and thus it is possible to obtain the errors for the edge position in chronological order. FIGS. 7A and 7B show the examples of the chronological information of the errors obtained at this time. The chronological information includes the errors at the edge position of the respective workpiece images, and is created based on the plurality of workpiece images sequentially obtained and held in association with the edge position.

In the examples shown in FIGS. 7A and 7B, the chronological information is graphically represented where a horizontal axis represents the number of measurement times and a vertical axis represents measured error values. Further, each of the graphs displays a line 2 indicating average values of the errors, determination lines 4a and 4b corresponding to standard deviations σ of the errors, and tolerance lines 3a and 3b respectively indicating an upper limit and a lower limit of the tolerance. Such graphical representation facilitates identification of a time position at which a substantial change has occurred in the errors.

FIG. 7A shows the example in which measurement accuracy drastically deteriorates during successive measurement, that is, after T-th measurement. In such a case, there is a possibility that an emergent abnormity has occurred in the manufacturing environment of the user. On the other hand, in the case shown in FIG. 7B, there is a large variation in overall processing accuracy of the workpieces, and thus, for example, there is a possibility that there is a variation in the positioning accuracy of the workpieces during the processing, or that it is not possible to stably maintain the processing accuracy due to age-related degradation of the processing apparatus itself.

Figure 8:
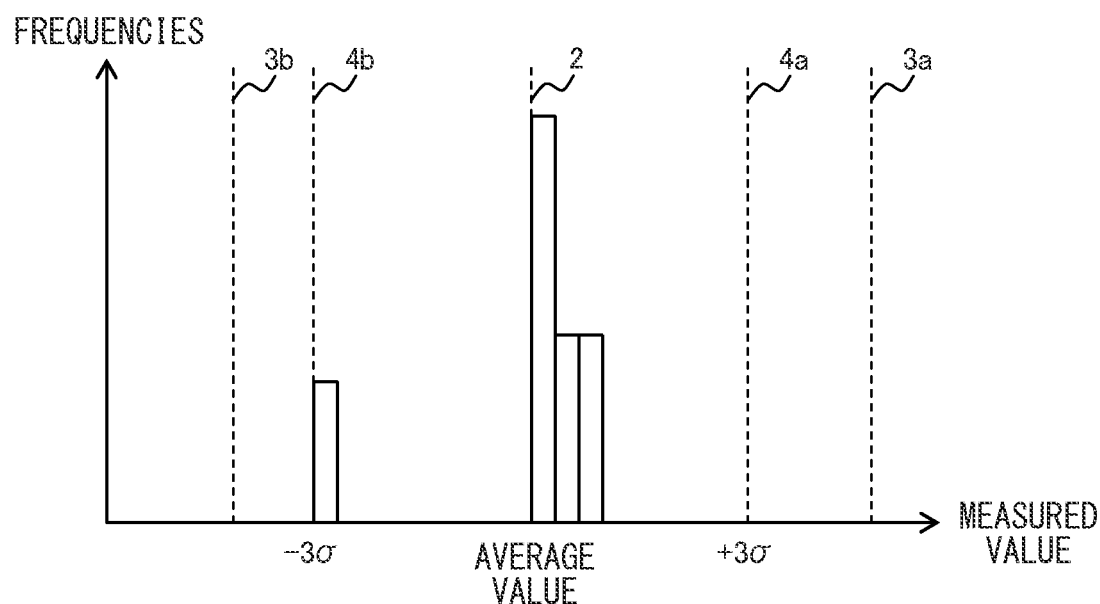
FIG. 8 is a graph showing one example of the operation when displaying the measurement result of the image measurement device 100 of FIG. 1, showing a frequency distribution for each measured value associated with an edge position.

FIG. 8 is a graph showing one example of the operation when displaying the measurement result of the image measurement device 100 of FIG. 1, showing frequency distributions of respective measured values associated with an edge position. FIG. 8 shows one example of graphical representation of statistical information, in which a frequency of appearance of the measured values is the statistical information where a horizontal axis represents the measured error values and a vertical axis represents frequencies.

As described above, confirming the chronological information of the errors and the frequency distribution facilitates to track down when and why defective products have occurred. However, simply confirming such chronological information is not sufficient to figure out which site of the workpieces as a whole the defects occur particularly frequently. That is, only with the chronological information and the frequency distribution, although it is possible to confirm a chronological change of the errors, it is difficult to make evaluation and analysis for each site of the workpiece.

Therefore, in this embodiment, the statistical information of the errors is calculated for each edge position, and the calculated statistical information is displayed superimposed over a contour of the workpiece image or the design data.

Superimposed Display of Statistical Information Over Workpiece Image

Figure 9:
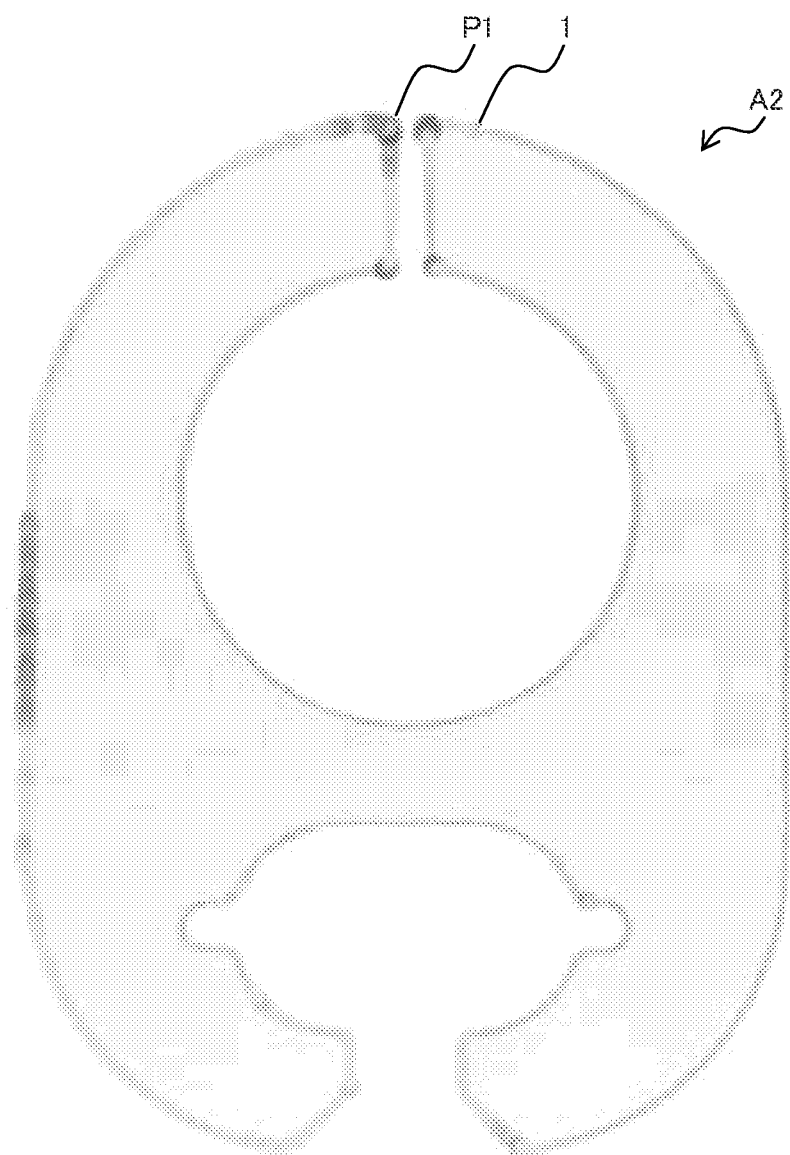
FIG. 9 is a view showing one example of the operation when displaying the measurement result of the image measurement device 100 of FIG. 1, showing a workpiece image A2 with which dots 1 indicating statistical information are disposed.
Figure 10:
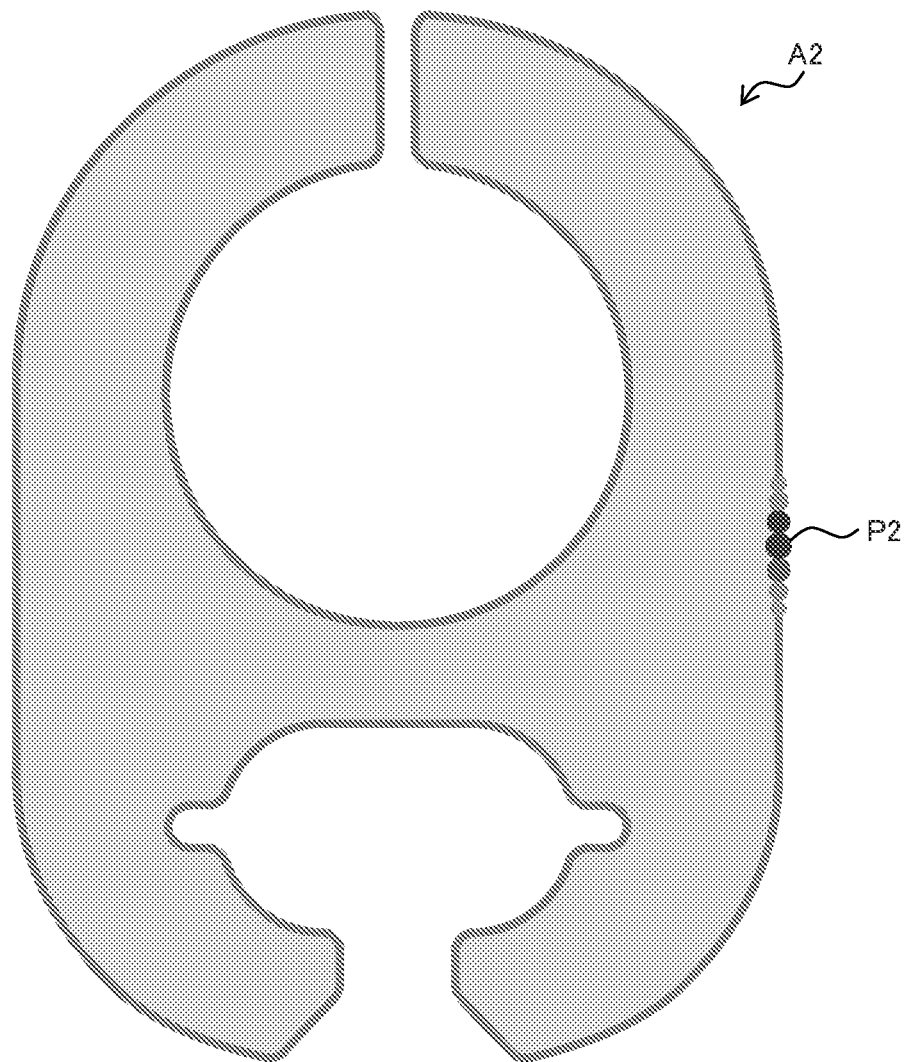
FIG. 10 is a view showing another example of the operation when displaying the measurement result of the image measurement device 100 of FIG. 1, showing the workpiece image A2 with which the dots 1 indicating statistical information are disposed.

FIGS. 9 and 10 are views respectively showing examples of the operation when displaying the measurement result of the image measurement device 100 of FIG. 1, each showing a workpiece image A2 with which dots 1 indicating the statistical information of the error are disposed along the edge line. The workpiece image A2 is an image of a workpiece within the low-magnification visual field picked up at a low magnification, for example. In FIGS. 9 and 10, an image of the workpiece placed within the detection area 13 picked up during the transmitted illumination is shown.

By analyzing the workpiece image A2 based on the characteristic amount information of the measurement configuration data, it is possible to specify a placement state of the workpiece such as the position and the posture of the workpiece within the low-magnification visual field. The edge of the workpiece image A2 is extracted by analyzing the workpiece image A2 based on the placement state of the workpiece.

Specifically, points along the edge are detected by analyzing brightness change of the workpiece image A2. Then, by fitting geometric figures such as straight lines and circular arcs over the edge points using a statistical method such as the method of least squares for the plurality of edge points that have been detected, it is possible to obtain the contour of the workpiece as the edge.

Obtaining the edge positions of the plurality of workpiece images A2 obtained by sequentially imaging the plurality of workpieces having the same shape and substantially the same size results in a variation in contours of the workpiece images A2 due to a size variation of the workpieces in manufacturing.

According to the image measurement device 100 of this embodiment, a degree of disagreement between the contours is indicated by the dots 1 of different sizes and hues depending on the values of the statistical information. The error is a parameter indicating an amount of displacement between an edge position of the workpiece image A2 and a position corresponding to this edge position of the master image. The statistical information is an index indicating a degree of divergence for each edge position, and provided as a result of calculation of the errors for the plurality of workpiece images A2. For example, an average value of the errors relating to the plurality of workpieces, a variance value of the errors, a ratio of "pass", a ratio of "fail", a slope of a moving average of the errors, a maximum value of the errors, a minimum value of the errors, and the like are calculated as the statistical information. The ratio of "fail" is a ratio of the errors exceeding the tolerance.

The dots 1 are display objects displayed in a display mode suitable for the values of the statistical information, and configured for example as circular areas of different sizes and hues depending on the values of the statistical information. The dots 1 are disposed on the edge positions along the edge line extracted from the workpiece image A2 or the master image A1. In this example, the dots 1 are disposed along the edge line of the workpiece image A2. The dots 1 can be displayed along the edge line of the master image A1.

The user can select the statistical information from various types of values. FIG. 9 shows a display example in which the average value of the errors is selected as the statistical information, and one of the dots 1 at the edge position where the error occurs frequently on average is displayed in a large size. On the other hand, FIG. 10 shows a display example in which the variance value of the errors is selected as the statistical information, and one of the dots 1 at the edge position where a variance of the errors occurs frequently is displayed in a large size. As shown in FIGS. 9 and 10, switching between the types of the statistical information to be displayed may change the edge position at which the corresponding dot 1 is displayed in a large size.

As described above, by switching between the types of the statistical information to be displayed, the user can confirm error information according to characteristics of the corresponding statistical information. When the variance value of the errors is large, for example, there is a possibility that there is a variation in the positioning accuracy of the workpieces during the processing, or that it is not possible to stably maintain the processing accuracy due to age-related degradation of the processing apparatus itself. On the other hand, by confirming the slope of the moving average of the errors, it is possible to determine a particular site at which the processing accuracy drops chronologically at a rate higher than other portions. With this, the user can easily track down a cause of a problem and take necessary measures.

Further, in this embodiment, when the user specifies an edge position P1 in FIG. 9, the chronological information as shown in FIG. 7A is displayed, for example. As the average value of the errors is large at the edge position P1, the displayed chronological information shows that large errors have successively occurred. In contrast, when the user specifies an edge position P2 in FIG. 10, the chronological information as shown in FIG. 7B is displayed. At the edge position P2, the chronological information shows a large variance value although the average value of the errors is small. In this manner, the user can confirm the change of the error over time that cannot be confirmed in the superimposed display of the statistical information by specifying any edge position in the superimposed display of the statistical information that has in particular caught the user's attention.

"Thin Out" Display

Figure 11:
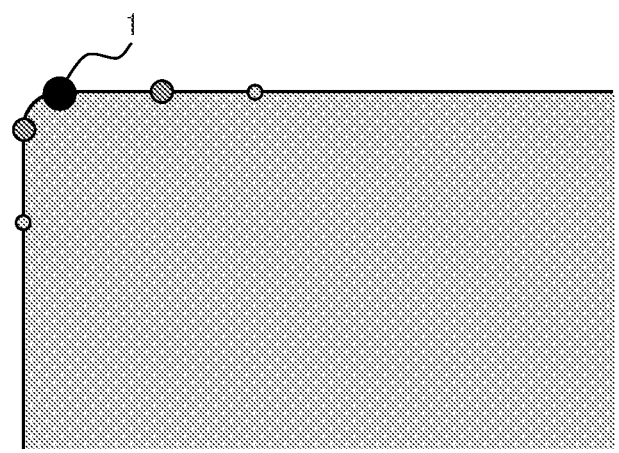
FIG. 11 is a view showing yet another example of the operation when displaying the measurement result of the image measurement device 100 of FIG. 1, showing a case in which the number of the dots 1 is reduced by "thinning out" and disposed along an edge line.

FIG. 11 is a view showing yet another example of the operation when displaying the measurement result of the image measurement device 100 of FIG. 1, showing a case in which the number of the dots 1 indicating the statistical information of the errors is reduced by "thinning out" and disposed along the edge line. While the dots 1 of different sizes and hues depending on the values of the statistical information can be displayed by pixel when the dots are displayed on the edge positions along the edge line, it is desirable to display the dots by "thinning out" such that the statistical information and the dots 1 are easily identified. The "thin out" display is to display the dots 1 along the edge line at predetermined intervals.

Control Unit

Figure 12:
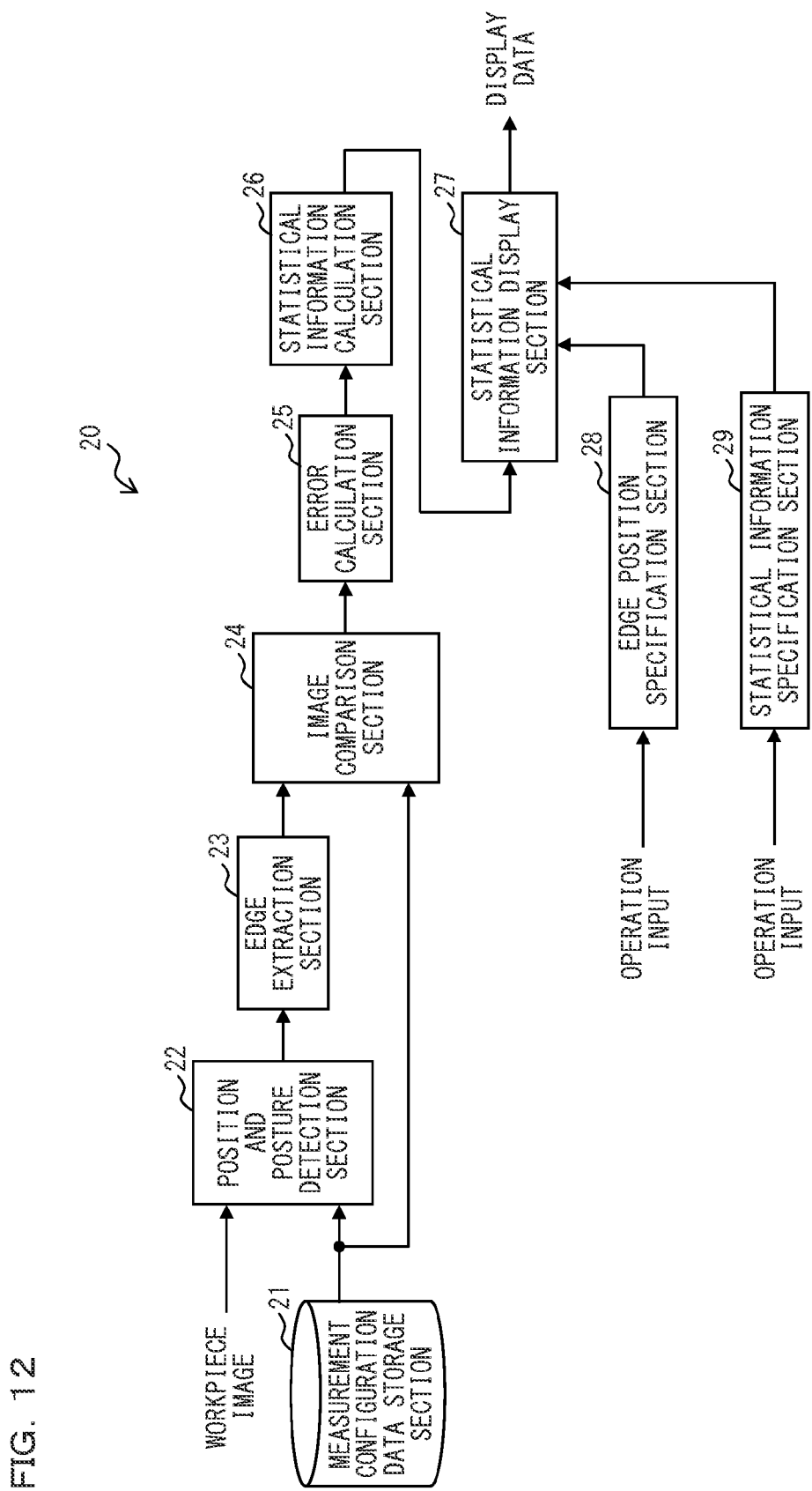
FIG. 12 is a block diagram showing an example of a configuration of a control unit 20 in the image measurement device 100 of FIG. 1, showing one example of a functional configuration within the control unit 20.

FIG. 12 is a block diagram showing an example of a configuration of the control unit 20 in the image measurement device 100 of FIG. 1, showing one example of a functional configuration within the control unit 20. The control unit 20 includes a measurement configuration data storage section 21, a position and posture detection section 22, an edge extraction section 23, an image comparison section 24, an error calculation section 25, a statistical information calculation section 26, a statistical information display section 27, an edge position specification section 28, and a statistical information specification section 29.

The measurement configuration data storage section 21 previously holds the master image as the measurement configuration data. The position and posture detection section 22 obtains the workpiece image from the measuring unit 10, and analyzes the workpiece image based on the characteristic amount information read from the measurement configuration data storage section 21, thereby detecting the position and the posture of the workpiece. The edge extraction section 23 extracts the edge from the workpiece image based on a result of the detection by the position and posture detection section 22. The image comparison section 24 compares the workpiece image with the master image read from the measurement configuration data storage section 21, and outputs a result of the comparison to the error calculation section 25.

The error calculation section 25 calculates, based on the result of the comparison by the image comparison section 24, the error indicating the amount of displacement between the edge position of the workpiece image and the position of the master image corresponding to this edge position, and outputs the calculated error to the statistical information calculation section 26. The statistical information calculation section 26 calculates, based on the errors respectively calculated for the plurality of workpiece images, the statistical information indicating the degree of divergence for each edge position, and outputs the calculated statistical information to the statistical information display section 27.

The statistical information display section 27 generates screen data for displaying the inputted statistical information on the edge position along the edge line in the display mode suitable for the value, and outputs the generated data to the measuring unit 10. Specifically, the dots 1 indicating the statistical information are displayed on the edge positions along the edge line extracted from the workpiece image or the master image. The sizes and the hues of the dots 1 vary according to the values of the statistical information.

The edge position specification section 28 specifies an edge position in the workpiece image or the master image based on a predetermined input operation by the user. When an edge position is specified by the edge position specification section 28, the statistical information display section 27 performs the operation to display the chronological information corresponding to the specified edge position.

The statistical information specification section 29 specifies the statistical information to be displayed based on a predetermined input operation by the user. When statistical information is specified by the statistical information specification section 29, the statistical information display section 27 performs the operation to display the specified statistical information along the edge line.

Display Flow of Statistical Information

Figure 13:
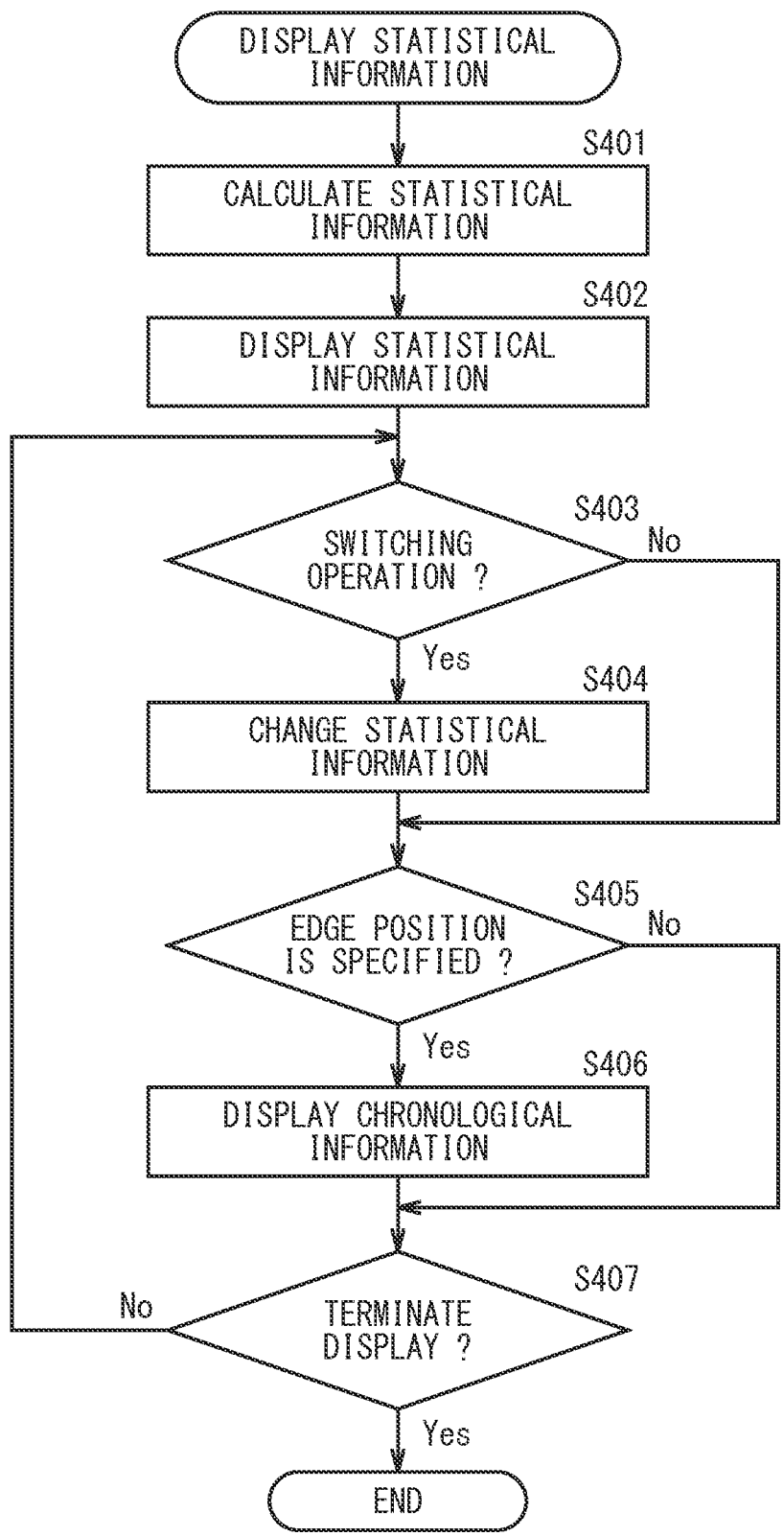
FIG. 13 is a flowchart showing one example of an operation when displaying the statistical information in the image measurement device 100 of FIG. 1.

Steps S401 to S407 in FIG. 13 show a flowchart of one example of the operation when displaying the statistical information in the image measurement device 100 of FIG. 1. The statistical information calculation section 26 calculates the statistical information indicating the errors of the respective edge positions based on the errors calculated for the plurality of workpiece images (step S401). The statistical information display section 27 displays the dots 1 indicating the statistical information on the edge positions along the edge line (step S402).

Next, the statistical information display section 27 changes the displayed statistical information when receiving a predetermined switching operation for changing the statistical information to be displayed (steps S403 and S404). Further, when the edge position is specified, the statistical information display section 27 graphically represents the chronological information associated with the specified edge position (steps S405 and S406). The procedures from step S403 to step S406 are repeated until an instruction to terminate the display is made (step S407).

According to this embodiment, the statistical information indicating the error of each edge position is calculated based on the error between the edge position of the workpiece image A2 and the corresponding position of the master image A1 for the plurality of workpiece images A2, and is displayed along the edge line. This facilitates the identification of the statistical information of the error of any point along the edge line. Therefore, it is possible to facilitate the identification of the degree of disagreement between the contours of the plurality of workpieces.

Further, it is possible to switch the statistical information to be displayed along the edge line by the user's operation. Moreover, by specifying the edge position, it is also possible to confirm the chronological information of the error associated with the specified edge position.

It should be appreciated that although this embodiment describes the example in which the dots 1 of different sizes and hues depending on the values of the statistical information are displayed on the edge positions along the edge line, it is possible to employ other display modes as long as the values of the statistical information can be identified. The present invention includes an example in which histograms showing different heights depending on the values of the statistical information are displayed on the edge positions along the edge line.

REFERENCE SIGNS LIST

1 Dot
10 Measuring unit
11 Display
11a Display screen
12 Movable stage
13 Detection area
14a XY position adjustment knob
14b Z position adjustment knob
15 Power switch
16 Measurement start switch
20 Control unit
21 Storage section for object image
22 Storage section for matching image
23 Contour detection section
23a Position and posture detection section
23b Edge detection section
23c Fitting section
24 Contour reference storage section
25 Statistic value calculation section
26 Statistic value display section
27 Position specification section
31 Keyboard
32 Mouse
40 Casing
41 Z drive section
42 XY drive section
43, 44 Imaging device
50 Transmitted illumination unit
51 Transmitting illumination light source
52 Mirror
53 Optical lens
60 Ring illumination unit
71 Coaxial epi-illumination light source
72 Half mirror
80 Receiver lens unit
81, 84, 86 Receiver lens
82 Half mirror
83, 85 Throttle plate
100 Image measurement device
A1 Master image
A2 Workpiece image

What is claimed is:

1. An image measurement device for obtaining a workpiece image by imaging the workpiece and measuring a size of the workpiece based on edge positions of the workpiece image, the image measurement device comprising;
   a control unit that includes an edge extraction section that is configured to extract the edges from the workpiece image;
   said control unit includes an image comparison section that is configured to compare the workpiece image and a previously stored design data;
   said control unit includes an error calculation section that is configured to calculate the errors indicating an amount of displacement between the edge positions of the workpiece image and positions of the design data corresponding to the edge positions;
   said control unit includes a statistical information calculation section that is configured to calculate the statistical information of the errors respectively calculated in chronological order for a plurality of workpiece images for the each edge positions, wherein the statistical information is an index indicating a degree of divergence for each edge position, and provided from calculation of the errors for the plurality of workpiece images; and
   a statistical information specification section for specifying the type of the statistical information to be displayed,
   said control unit includes a statistical information display section that is configured to generate screen data for displaying the specified statistical information along the edge positions extracted from the workpiece image or the design data in a display mode suitable for the values of the statistical information.

2. The image measurement device according to claim 1, wherein the statistical information calculation section calculates at least one of an average value of the errors, a variance value of the errors, a ratio of the errors not exceeding a tolerance, a ratio of the errors exceeding the tolerance and a slope of a moving average of the errors, and
   the statistical information display section displays the specified statistical information along the edge positions.

3. The image measurement device according to claim 2, said control unit further comprising;
   an edge position specification section for specifying an edge position in the workpiece image or the design data, wherein the statistical information display section displays a chronological information including the errors of the respective workpiece images at the specificated edge position.

4. The image measurement device according to claim 1, wherein the statistical information display section displays dots in different colors corresponding to the values of the statistical information along the edge positions.

5. The image measurement device according to claim 1, wherein the statistical information display section displays dots in different size depending on the values of the statistical information along the edge positions.

6. The image measurement device according to claim 1, wherein the statistical information display section displays histograms showing different heights corresponding to the values of the statistical information along the edge positions.

7. An image measurement method for obtaining a workpiece image by imaging the workpiece and measuring a size of the workpiece based on edge positions of the workpiece image, the image measurement method comprising;
   extracting the edges from the workpiece image;
   comparing the workpiece image and a previously stored design data;
   calculating the errors indicating an amount of displacement between the edge positions of the workpiece image and positions of the design data corresponding to the edge positions;
   calculating in chronological order, the statistical information of the errors respectively calculated for a plurality of workpiece images for the each edge positions wherein the statistical information is an index indicating a degree of divergence for each edge position, and provided from calculation of the errors for the plurality of workpiece images; and specifying the type of statistical information to be displayed; and
   displaying the specified statistical information along the edge positions extracted from the workpiece image or the design data in a display mode suitable for the values of the statistical information.

8. A non-transitory computer readable medium storing program for image measurement device for obtaining a workpiece image by imaging the workpiece and measuring a size of the workpiece based on edge positions of the workpiece image, the image measurement program comprising;

extracting the edges from the workpiece image;

comparing the workpiece image and a previously held design data;

calculating the errors indicating an amount of displacement between the edge positions of the workpiece image and positions of the design data corresponding to the edge positions;

calculating in chronological order the statistical information of the errors respectively calculated for a plurality of workpiece images for the each edge positions wherein the statistical information is an index indicating a degree of divergence for each edge position, and provided from calculation of the errors for the plurality of workpiece images; and specifying the type of statistical information to be displayed; and displaying the specified statistical information along the edge positions extracted from the workpiece image or the design data in a display mode suitable for the values of the statistical information.

* * * * *